Figure 1:
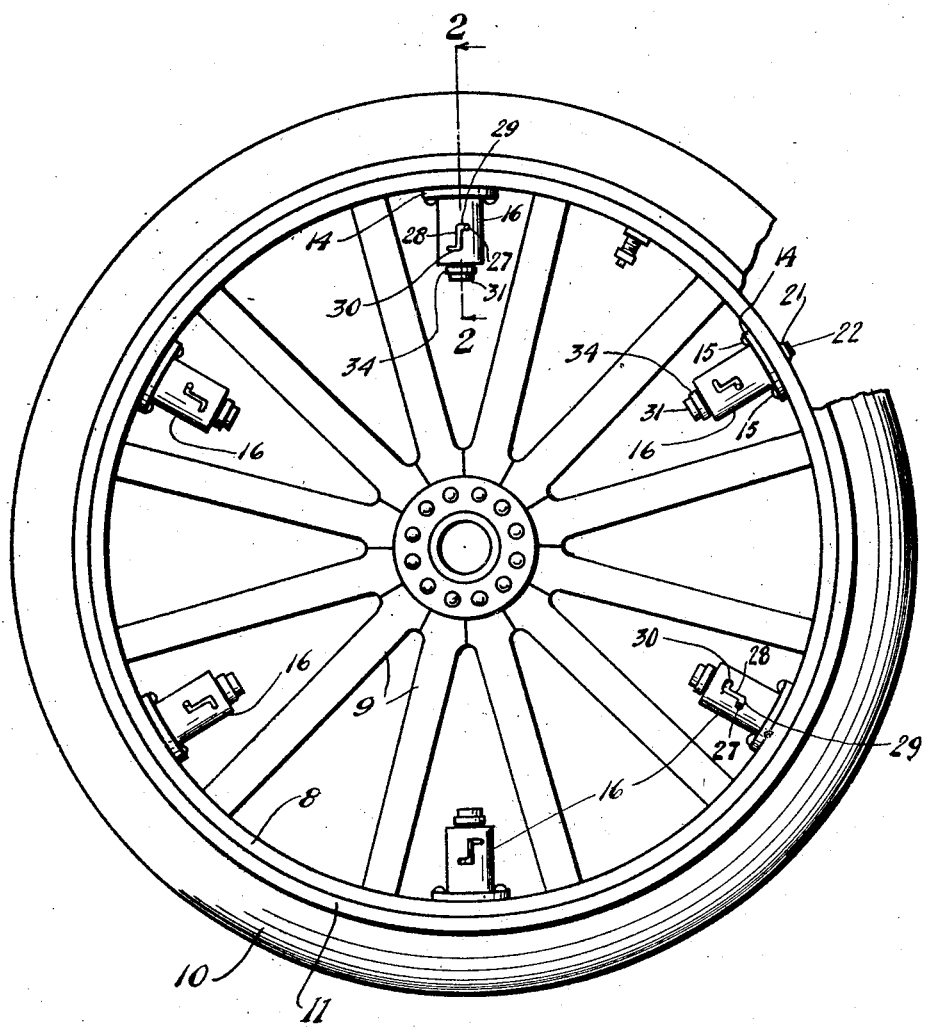

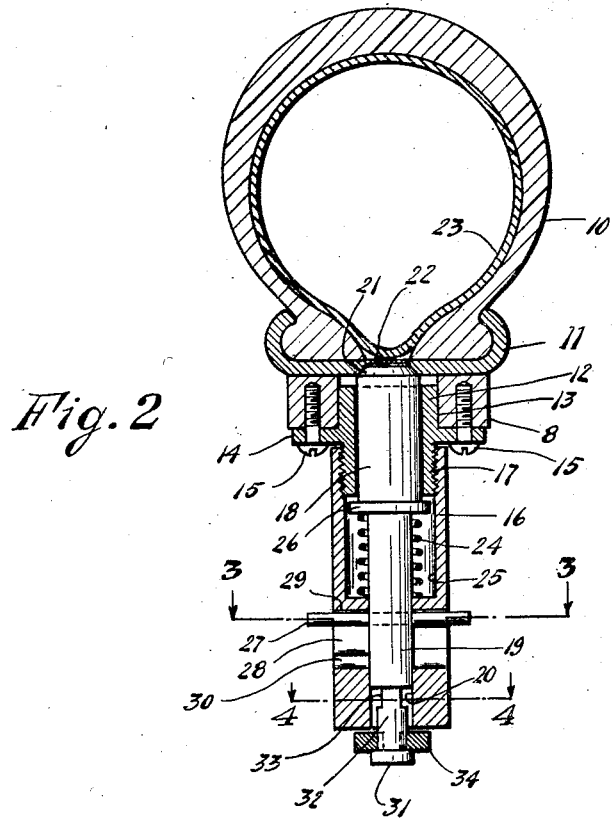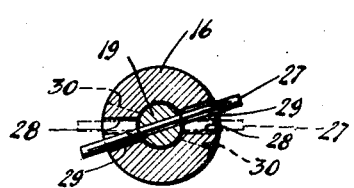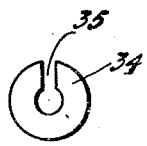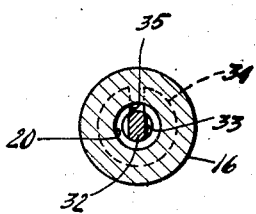

Patented Oct. 20, 1925.

1,557,862

UNITED STATES PATENT OFFICE.

WILLIAM F. MORGAN, OF CHICAGO, ILLINOIS.

WHEEL WITH DEMOUNTABLE RIM.

Application filed March 26, 1923. Serial No. 627,583.

*To all whom it may concern:*

Be it known that I, WILLIAM F. MORGAN, a citizen of the United States, and a resident of the city of Chicago, county of Cook, and State of Illinois, have invented certain new and useful Improvements in Wheels with Demountable Rims, of which the following is a specification.

My invention relates to wheels with demountable rims and has for its object to provide means on the wheel by the use of which the tire can be easily and speedily mounted on the wheel and demounted therefrom.

Another object is to provide means for locking the tire retaining means either in an operative position or a released position.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevation of a wheel with a plurality of my rim holding devices mounted in position thereon, Fig. 2 is an enlarged section taken on line 2—2 of Fig. 1, across the rim and tire and longitudinally of the device, Fig. 3 is a cross section taken on line 3—3 of Fig. 2, Fig. 4 is a cross section taken on line 4—4 of Fig. 2, and Fig. 5 is a view of the cap retaining washer.

In the drawings I have shown a plurality of my rim fastening devices mounted in position on the outer part or felloe 8 of a wheel 9 of an automobile, at equal distances apart and in engagement with the outer tire or casing 10 and the attached rim 11 of said wheel 9.

The device comprises a tubular member or sleeve 12 having a portion mounted in an opening 13 provided in the felloe 8, as best seen in Fig. 2. The sleeve is also provided with a radial flange 14 fastened against the inner surface of said felloe by means of screws 15, or other suitable fastening means. A cap or covering member 16 with internal threads is removably mounted on the threaded neck 17 of said sleeve.

The means for engaging and holding the tire casing and attached rim in position on the wheel includes a member or plunger 18 which is slidably mounted in sleeve 12, and has a reduced stem 19 mounted in a bore 20 in the cap 16. A bevelled portion 21 and a reduced point 22 are provided on said plunger to engage into countersunk notches or seats in the rim 11, said bevelled portion and reduced point being constructed of exact length and size to fit in said seats in said rim and to hold said rim firmly in position on the wheel, without engaging or injuring the inner tube 23. A spring 24 positioned in a chamber 25 in cap 16 egages a wall in said chamber and a flange or collar 26 on plunger 18 to retain said plunger in its operative position.

The means for locking the plunger in its operative and in its released position includes a pin 27 fastened with a driving fit in the stem 19 of the plunger and operating in an S-shaped slot 28 provided laterally through the sleeve 16. The pin extends from beyond said slot and may extend therefrom with one end or both ends as desired, thereby providing means for engagement by the hand to operate the plunger.

To operate the device and move the plunger to its released position, it is only necessary to take hold of each pin 27 and turn it laterally out of the outward cross portion 29 of the slot 28 and into the longitudinal part of said slot, then move the pin with the plunger longitudinally through said slot and the sleeve toward the center of the wheel, and thereafter turn said pin laterally into the portion 30 of said slot 28, at the inward part of the wheel, thereby locking the plunger in released or withdrawn position. With all plungers thus locked in released position it is an easy matter to slide and remove the tire and its rim laterally from the outer part or felloe of the wheel. To return the plungers to operative position each pin is turned out of its portion 30 of slot 28 whereupon the spring 24 by its pressure on collar 26 pushes the point of the plunger into engagement with the rim, and a lateral turn of said pin into the lateral portion 29 of slot 28 locks the pin and plunger together into the operative position.

Means is also provided for preventing the cap 16 from unscrewing from sleeve 12 and becoming separated therefrom. This means comprises a retaining flange 31 at the free end of a reduced portion 32 of stem 19, a pair of notches 33 cut in opposite sides on said reduced portion 32, and a washer 34 with an opening 35 cut in one side, and being substantially in the shape of a horseshoe. This washer is slid over the notches 33 when the plunger is moved to its released or withdrawn position, and it is then moved along the reduced portion 32 into engagement with the outer flange 31, and when the plunger is next moved into operative position this washer substantially engages the outer end of cap 16. And in case the travelling and shaking of the wheel should start to unscrew cap 16 on neck 17, the cap would at once seat itself firmly against said washer, while the spring 24 which is strong and constantly under compression would effectively hold the plunger in its operative position, thereby preventing any further unscrewing or loosening of the cap from the sleeve and thus effectively preventing the cap from accidentally becoming lost from said sleeve.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described, comprising a sleeve mounted on the felloe of a wheel, a cap removably mounted on the end of said sleeve, a plunger slidably mounted in said sleeve and cap and engaging in a tire carrying rim mounted on said felloe, a slot with transverse notches provided in said cap, and a pin on said plunger movable in said slot and engageable in one of said notches to lock said plunger in its operative position or in the other of said notches to lock said plunger in released position.

2. A device of the class described comprising supporting means fastened to the felloe of a wheel, a cap removably attached to said means, a plunger mounted in said means and cap and engageable with a tire carrying rim on said felloe, a flange and an adjacent notch at one end of said plunger, and a horse-shoe washer mountable on said plunger by sliding it over said notch, said washer being adapted to rest against said flange to prevent said cap from being accidentally removed or lost from said device.

3. A device of the class described comprising a sleeve mounted in the felloe of a wheel, a flange on said sleeve with which the sleeve is fastened to said felloe, a cap removably mounted on the threaded end of said sleeve, a plunger slidably mounted in said sleeve and cap and engaging in a tire carrying rim mounted on said felloe, resilient means for normally holding said plunger in rim engaging position, a slot with two transverse notches provided in said cap, and a pin on said plunger movable through said slot and engageable in one of said notches to lock said plunger in its operative position and in the other of said notches to lock said plunger in released position.

In testimony whereof I have signed my name to this specification.

WILLIAM F. MORGAN.